A. I. Judge.
Expanding Wheel-Hub.

Nº 73342.

Patented Jan. 14, 1868.

Witnesses

Inventor

United States Patent Office.

ARTHUR I. JUDGE, OF BALTIMORE, MARYLAND.

Letters Patent No. 73,342, dated January 14, 1868.

IMPROVEMENT IN EXPANDING WHEEL-HUB

*The Schedule referred to in these Letters Patent and making part of the same.*

TO ALL WHOM IT MAY CONCERN:

Be it known that I, ARTHUR I. JUDGE, of Baltimore, in the county of Baltimore, in the State of Maryland, have invented a new and improved Expanding Wheel-Hub; and I do hereby declare that the following is a full and exact description thereof, reference being had to the accompanying drawings, and letters of reference marked thereon.

The nature of my invention consists in having a movable inclined plane, upon which one end of the spokes is to rest, said inclined plane or wedge being driven under the spokes by means of screws, which will expand the spokes firmly against the tire or outside rim of wheel, and prevent the necessity of cutting the tires.

To enable others skilled in the art to make and use my invention, I will proceed to describe its construction and operation.

Figure 2:
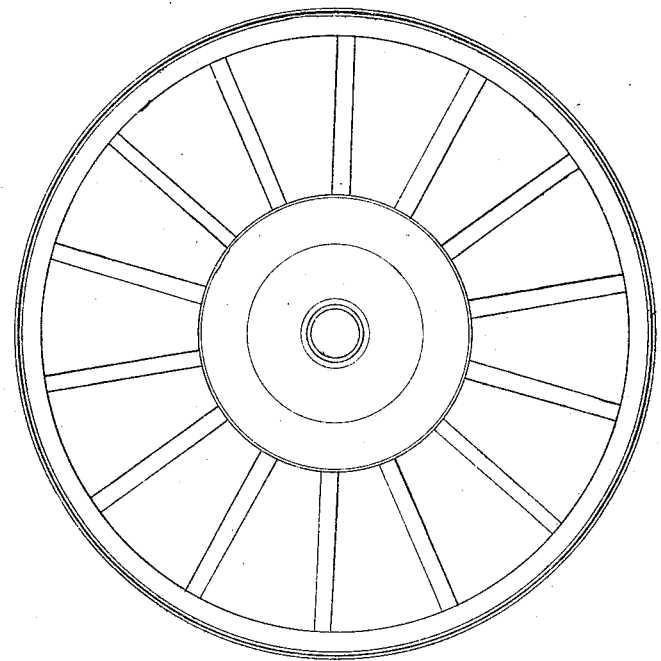
Figure 2:
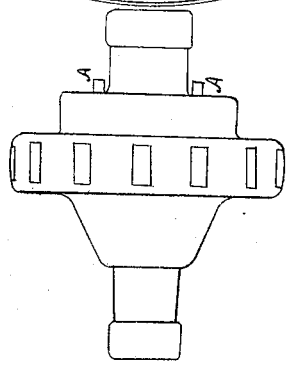
Figure 1:
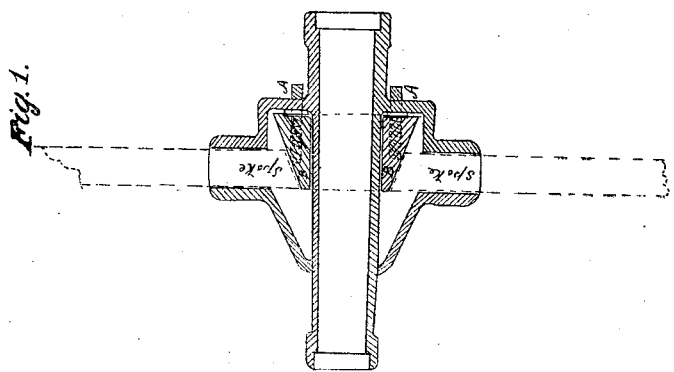

I construct my hubs of any suitable material or desirable form, plain or ornamental, providing only for a recess or chamber, in which the inclined plane B, Figure 1, is to move backwards or forwards under the spokes. The hub may be made in parts, as shown at fig. 1, or all cast together, as at Figure 2, with the ring cast loose in the chamber. Any number of screws or bolts, A, figs. 1 and 2, can be put in the ring or inclined plane B, fig. 1, but three will, perhaps, answer all required purposes.

If the screws on said bolts are cut left-handed, the wheel can be tightened by right-handed turns.

As my hub will be useful for all kinds of wagons, carriages, wheel-barrows, and cars, I claim it for all vehicles or purposes to which it may be applied, including army-wagons, gun-carriages, &c.

One great advantage it offers is, that a broken spoke can be replaced without the aid of a blacksmith, as, by slackening the screws, the tire is relieved of pressure, and all the parts of the wheel can be removed or replaced. It is also suitable for iron wheels, with tube or solid spokes, square or any form.

What I claim as my invention, and desire to secure by Letters Patent, is—

1. An adjustable base, with an inclined face, against which the ends of the several spokes of a wheel bear, so arranged that the spokes may be simultaneously more or less extended through the hub, by changing the position of the inclined base, substantially as and for the purpose set forth.

2. In combination with a chambered hub, I claim the conical base B and adjusting-screws A, substantially as and for the purpose set forth.

ARTHUR I. JUDGE.

Witnesses:
SYLVESTER CLARKE,
BENJ. M. HUGHEY.